US012799669B2

(12) United States Patent
Andresen et al.

(10) Patent No.: US 12,799,669 B2
(45) Date of Patent: Nov. 17, 2026

(54) DEVICE FOR CAPTURING A CLOTH ITEM AND A METHOD OF OPERATING THE DEVICE

(71) Applicant: INWATEC APS, Odense SV (DK)

(72) Inventors: Mads Andresen, Odense SV (DK); Claes Stanley Nikolajsen, Odense SV (DK); Steffan Boytang Sørensen, Odense SV (DK); Laus Skovgaard Bigum, Odense SV (DK); Kasper Simonsen, Odense SV (DK); Tudor Morar, Odense SV (DK); Mathias Lyngbye, Odense SV (DK)

(73) Assignee: Inwatec ApS, Odense (DK)

( * ) Notice: Subject to any disclaimer, the term of this patent is extended or adjusted under 35 U.S.C. 154(b) by 180 days.

(21) Appl. No.: 18/859,776

(22) PCT Filed: May 4, 2023

(86) PCT No.: PCT/EP2023/061745
§ 371 (c)(1),
(2) Date: Oct. 24, 2024

(87) PCT Pub. No.: WO2023/213920
PCT Pub. Date: Nov. 9, 2023

(65) Prior Publication Data

US 2025/0257521 A1 Aug. 14, 2025

(30) Foreign Application Priority Data

May 6, 2022 (DK) ............................ PA 202200437

(51) Int. Cl.

| | |
|---|---|
| ***D06F 95/00*** | (2006.01) |
| ***B65G 47/90*** | (2006.01) |
| ***D06F 67/04*** | (2006.01) |

(52) U.S. Cl.
CPC ........... *D06F 95/00* (2013.01); *B65G 47/905* (2013.01); *D06F 67/04* (2013.01)

(58) Field of Classification Search
CPC ...... B65G 47/90; B65G 47/905; B65G 47/71; B65G 47/844; D06F 67/04; D06F 95/00
(Continued)

(56) References Cited

U.S. PATENT DOCUMENTS 3,469,887 A * 9/1969 Toyoda ................ B65G 19/303 65/25.2
4,297,927 A * 11/1981 Kuroda .................. B21D 43/10 83/13

(Continued)

FOREIGN PATENT DOCUMENTS

EP 2 930 264 A1 10/2015
EP 3 026 170 A1 6/2016

(Continued)

OTHER PUBLICATIONS

International Search Report and Written Opinion of the International Searching Authority dated Aug. 29, 2023 (13 pages) from PCT Priority Application PCT/EP2023/061745.

(Continued)

*Primary Examiner* — Gregory W Adams
(74) *Attorney, Agent, or Firm* — Crowell & Moring LLP

(57) ABSTRACT

A device for capturing a selected portion of a clean or dirty laundry item, in particular a linen or a towel item, the device including a first conveyor belt and a second conveyor belt, separated from each other by an elongated gap and configured to convey the laundry item across the gap in a first direction. A gripper is arranged to capture the selected portion from above and/or below when the selected portion passes the gap, the gripper being movable to remove the laundry item captured by the gripper from the second (Continued)

conveyor belt. A controller configured to activate the gripper for the capturing when the selected portion passes the gap and for the moving of the gripper.

16 Claims, 4 Drawing Sheets

(58) Field of Classification Search
USPC ......... 198/370.01, 379, 412, 457.07, 341.05, 198/346.2, 370.07; 414/13; 901/7
See application file for complete search history.

(56) References Cited

U.S. PATENT DOCUMENTS

| | | | | |
|---|---|---|---|---|
| 4,742,921 | A * | 5/1988 | Staley, III | B65G 47/248 198/457.07 |
| 9,908,152 | B2 | 3/2018 | Sielermann et al. | |
| 9,920,470 | B2 | 3/2018 | Tautz et al. | |
| 10,843,876 | B2 * | 11/2020 | Dugat | B65G 47/71 |
| 11,408,118 | B2 | 8/2022 | Yano et al. | |
| 2004/0262126 | A1 * | 12/2004 | Nielsen | B65G 47/244 198/379 |
| 2015/0292142 | A1 | 10/2015 | Tautz et al. | |
| 2016/0144407 | A1 | 5/2016 | Sielermann et al. | |
| 2019/0375602 | A1 * | 12/2019 | Katagiri | B65G 47/1492 |
| 2021/0172113 | A1 | 6/2021 | Yano et al. | |
| 2021/0237260 | A1 * | 8/2021 | Holopainen | B25J 11/008 |
| 2023/0150777 | A1 | 5/2023 | Skyum et al. | |

FOREIGN PATENT DOCUMENTS

| | | | |
|---|---|---|---|
| EP | 3 779 030 | A1 | 2/2021 |
| JP | H07231998 | A | 9/1995 |
| NL | 2023653 | B1 | 3/2021 |
| WO | WO 99/14420 | A1 | 3/1999 |
| WO | WO 2012/167071 | A1 | 12/2012 |
| WO | WO 2021/198053 | A1 | 10/2021 |

OTHER PUBLICATIONS

International Preliminary Report on Patentability (dated Nov. 7, 2024) and appended Written Opinion of the International Searching Authority (dated Aug. 29, 2023) (total 7 pages) from PCT Priority Application PCT/EP2003/061745.
Office Action (in foreign text) dated Oct. 10, 2022 out of Danish Priority Patent Application No. PA 2022 00437 (7 pages).

* cited by examiner

DEVICE FOR CAPTURING A CLOTH ITEM AND A METHOD OF OPERATING THE DEVICE

This application is a National Stage application of International Application No. PCT/EP2023/061745, filed May 4, 2023, the entire contents of which are incorporated herein by reference.

This application claims priority under 35 U.S.C. § 119(a) to Danish Patent Application No. PA202200437, filed on May 6, 2022, the entire contents of which are incorporated herein by reference.

BACKGROUND OF THE INVENTION

Field of the Invention

The present invention concerns a device for capturing a selected portion of a cloth item/a piece of cloth, such as a clean or dirty laundry item, in particular a linen or a towel item.

Description of the Related Art

U.S. Pat. Nos. 9,908,152 and 9,920,470 disclose devices with clamps having pivotally connected jaws for capturing a laundry item by attacking the opposite sides of an upstanding fold or crease of the laundry item.

The present invention aims at providing a simplified device for capturing a portion of a cloth item.

SUMMARY

In view of this object, a device is provided for capturing a selected portion of a cloth item, such as a clean or dirty laundry item, in particular a linen or a towel item, the device including a first conveyor belt and a second conveyor belt, separated from each other by an elongated gap and configured to convey the item across the gap in a first direction, a gripper arranged to capture the selected portion from above and/or below when the selected portion passes the gap, the gripper being moveable to remove the item captured by the gripper from the second conveyor belt, preferably by dragging/pulling it sideways off the second conveyor belt, and a controller configured to activate the gripper for the capturing when the selected portion passes the gap and for the moving of the gripper.

Thus, according to the invention an efficient clamping of the selected portion of the item may be achieved by the gripper engaging an upper and/or an opposite lower face of the selected portion of the item. In an embodiment, the capturing is by the gripper having a first capturing part acting in a piston-like manner by including a linearly moved pin with a free end defining a head contacting the selected portion and clamping the selected portion between the head and a second capturing part of the gripper.

In one embodiment a 2D (two-dimensional) image analysis is carried out to select the portion of the item to be captured. In another embodiment a 3D image analysis may be carried out to select the portion to be captured.

Also according to the invention a device is provided for capturing a selected portion of a cloth item, such as a clean or dirty laundry item, in particular a linen or a towel item, advanced by a conveyor belt, the device including a gripper for capturing the selected portion by suction, the gripper being movable from a capturing position above the conveyor belt to a position along a side of the conveyor belt to thereby remove the item captured by the gripper from the conveyor belt, a controller configured to move the gripper into the capturing position corresponding to an expected path of movement of the selected portion below the gripper, to activate the gripper for the capturing when the selected portion moved by the conveyor belt passes the capturing position, and for the moving of the gripper to the position along the side of the conveyor belt, and a device communicating with the controller, for registering an image, preferably a 2D image, of the item on the conveyor belt, seen from above the conveyor belt, the controller being configured to process that image to select the portion to be captured among corresponding portions of that image showing a tapering geometry with a tip portion.

Preferably, the device includes a cloth item contour and/or shape detector, such as a camera, the detector communicating with the controller, and the controller being configured to select, based on a 2D image of the item, candidate portions to be captured among corresponding portions of that image showing a tapering geometry with a tip portion. Among the candidate portions for selection, the controller may be configured to select the portion to be captured as an item trailing portion, i.e. a rearmost portion thereof lying on the conveyor belt. Alternatively, 3D image analysis may be carried out to select the portion to be captured.

Further preferred embodiments are defined herein.

DETAILED DESCRIPTION

The invention will now be explained in more detail below by reference to presently preferred embodiments, used in the context of laundry items.

Figure 1:
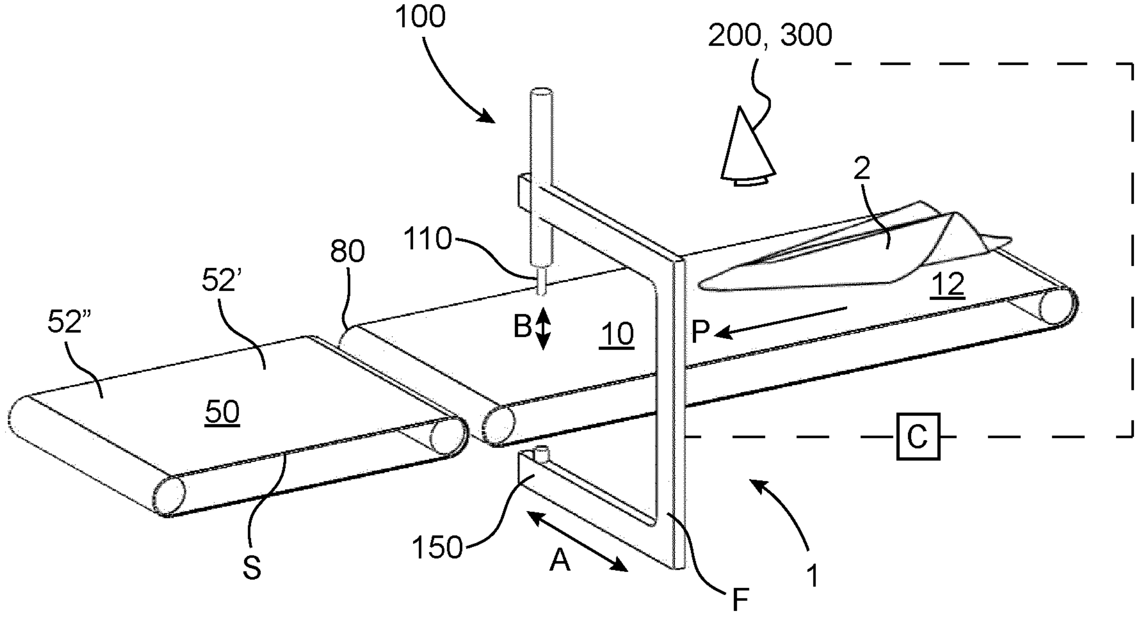
FIG. 1 is a perspective view of a first embodiment of the device of the present invention.

FIG. 1 shows a device 1 of the present invention, configured for capturing a selected portion of a cloth item, shown as a clean or dirty laundry item 2, in particular a portion of a rectangular linen item or a rectangular towel item having four corners.

The shown laundry item 2 lies in a more or less spread out form on a first or upstream conveyor belt 10 that moves the item 2 in a first direction P from an item receiving end or portion 12 of the first conveyor belt 10. Shown also is a downstream, second conveyor belt 50 operated also to move laundry items in the first direction P. An elongated gap 80 separates the downstream end of the first conveyor belt 10 from an upstream end or portion 52' of the second conveyor belt 50.

The elongated gap 80 has a relatively small width, selected such that a laundry item 2 moved by the first conveyor belt 10 will pass over/across the gap 80 and onto the second conveyor 50, and such that a gripper 100 can operate to grip and hold on to a selected portion of the laundry item 2, as that selected portion passes over/across the gap 80.

Figure 3:
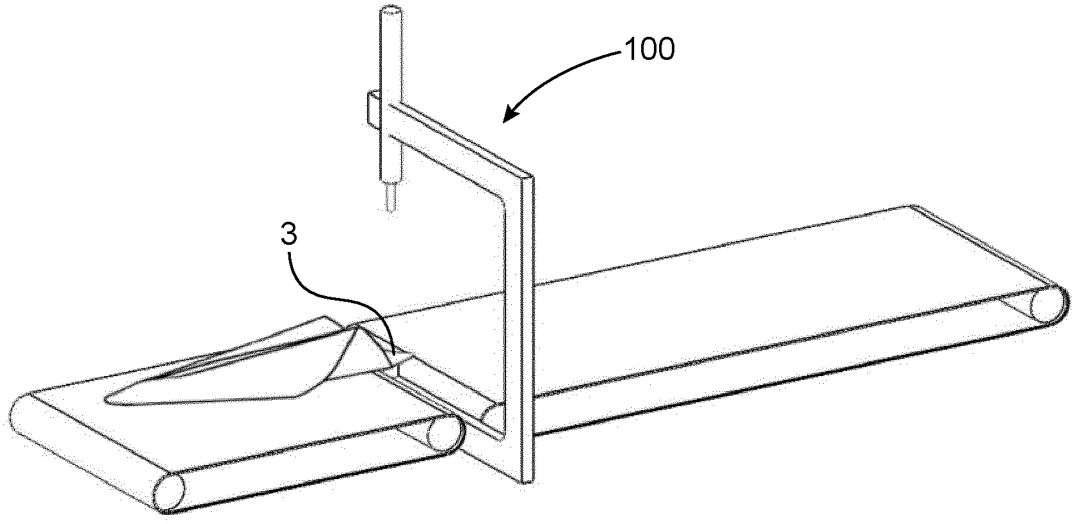
Figure 4:
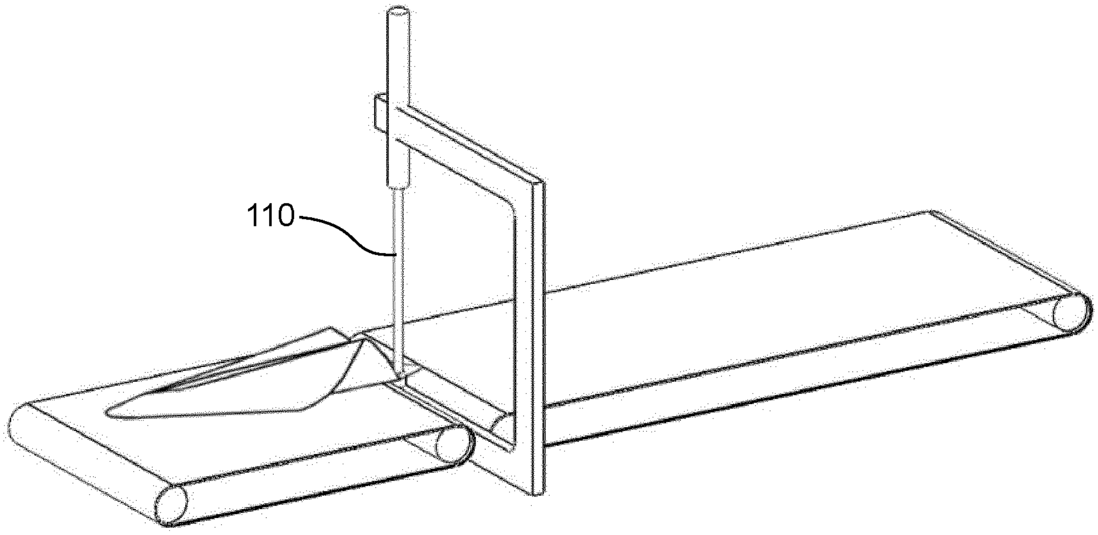

In the shown embodiment the gripper 100 has an upper capturing part 110 and a lower capturing part 150, both carried by a frame F arranged to move back and forth in a transverse direction, relative to the first direction P, as indicated by arrows A. At least one of the upper and lower capturing parts 110, 150 is movable from a non-capturing position towards the other capturing part 110, 150 along the shown upright direction B, to meet the other capturing part in a capturing position within, or slightly above, the gap 80, as shown in FIG. 4. The capturing position may in principle be anywhere along the length of the gap 80, in accordance with the position along the gap 80 into which the frame F has been moved in the transverse direction A. In the non-capturing position shown in FIGS. 1 and 3 laundry items 2 may pass unhindered onto the second conveyor 50.

In the capturing position a selected portion of the item 2 passing over/across the gap 80 may be captured and held between the upper and lower capturing parts 110, 150 by a clamping force applied by the upper and lower capturing parts 110, 150 against the upper and opposite lower face, respectively, of the selected portion of the laundry item 2.

In the preferred embodiment shown in FIG. 1 the upper capturing part 110 includes a vertically moving pin with a free end defining a head and moving towards the lower capturing part 150, which is defined by an abutment face fixed relative to the frame F, to engage from above the selected portion of the laundry item 2 and to press it against the abutment face. A hydraulically or pneumatically operated linear actuator may, by way of example only, be used to move the pin, which pin forms an extension of a piston rod and, accordingly, moves linearly. Using a pin with a free end having a relatively small areas allows for the gripper 100 to attack a relatively small portion of the laundry item 2 and to provide a relatively high clamping pressure onto the laundry item 2.

Shown in FIG. 1 is also a controller C, including a computer with a data storage/memory, that is configured i) to receive data from an item identifier, such as a sensor and camera 200, and an item contour and/or shape detector, such as sensor and camera 300, ii) to analyze the data and select the laundry item 2 portion to be captured based on stored data, iii) to activate the gripper 100 for the aforementioned capturing when the selected portion passes over the gap 80 and iv) to control movement of the gripper 100 along the transverse direction A.

Figure 2:
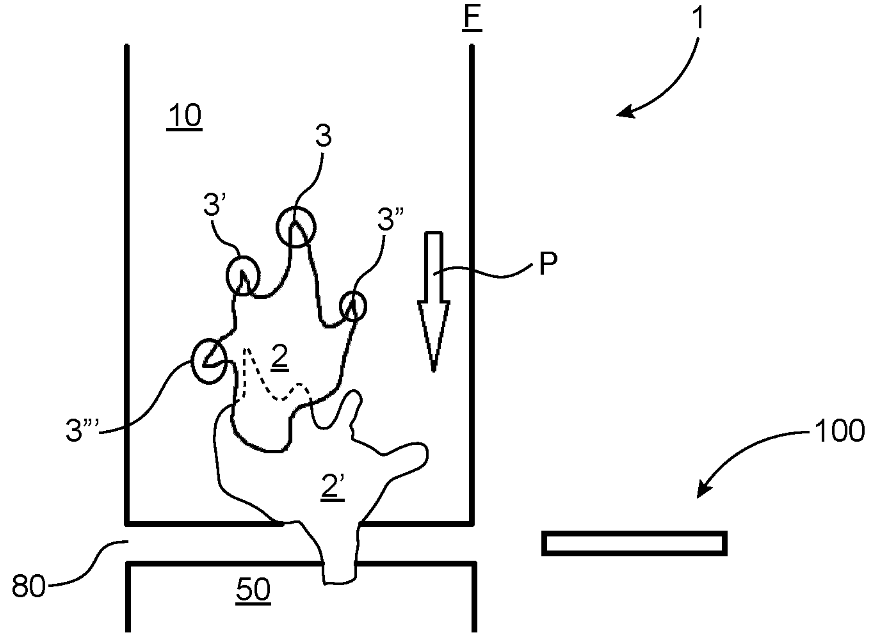
FIG. 2 is a top view of the first embodiment of the device, in operation with two laundry items passing through, FIGS. 3-7 are views similar to FIG. 1, showing different steps during the capturing and subsequent release of a laundry item.

FIG. 2 is a top view of the device 1, showing two items 2 lying one after the other on the first conveyor belt 10. The items 2 may have been dropped or deposited onto the first conveyor belt 10 in any non-specified and more or less random manner, either manually or from a feeding device, which may be a chute, to deliver a more or less continuous flow of the items 2, 2' to the first conveyor belt 10. The individual laundry items 2 may lie with folds, and be spaced apart from each other on the first conveyor belt 10, or with an overlap illustrated in broken line, whereby an upstream laundry item 2 overlaps a trailing portion of another, downstream laundry item 2'.

Generally, individual laundry items 2, 2' deposited either individually or together onto a moving conveyor belt will have identifiable portions, referenced in FIG. 2 by numerals 3, 3', 3", that are "free" in the sense that they are not covered by another laundry item 2'. Experience has shown that some of those free portions 3, 3', 3" often have a generally pointed shape when seen from above, as shown schematically in FIG. 2, and that those particular free portions likely correspond to the corners 4 of the laundry item 2, being in the form of a rectangular linen or towel sheet.

Capturing, using the very simple device 1 of present invention, a portion 3, 3', 3" of a laundry item 2 that from its shape is deemed likely to correspond to a corner 4 of that item 2, allows for such a captured laundry item 2 to be then processed in a downstream machinery of the type where the laundry item 2 is to be fed into the downstream machinery front edge first, being held at the captured corner 4 and at an adjacent corner. Such downstream machinery may for instance be a laundry ironer or a laundry folder.

Figure 5:
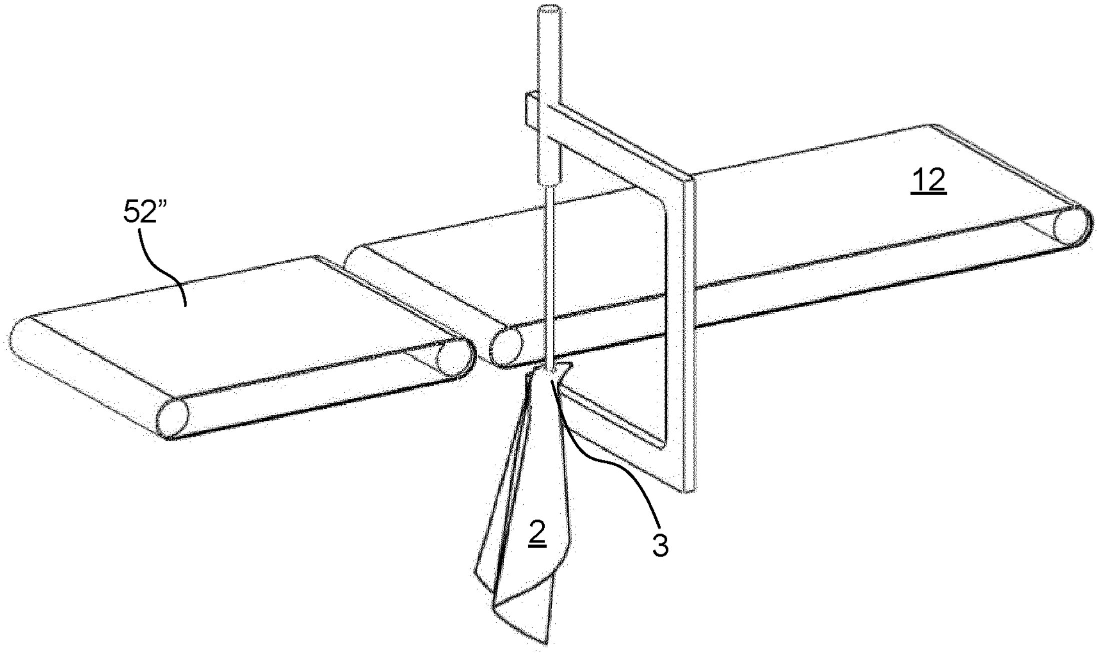
Figure 6:
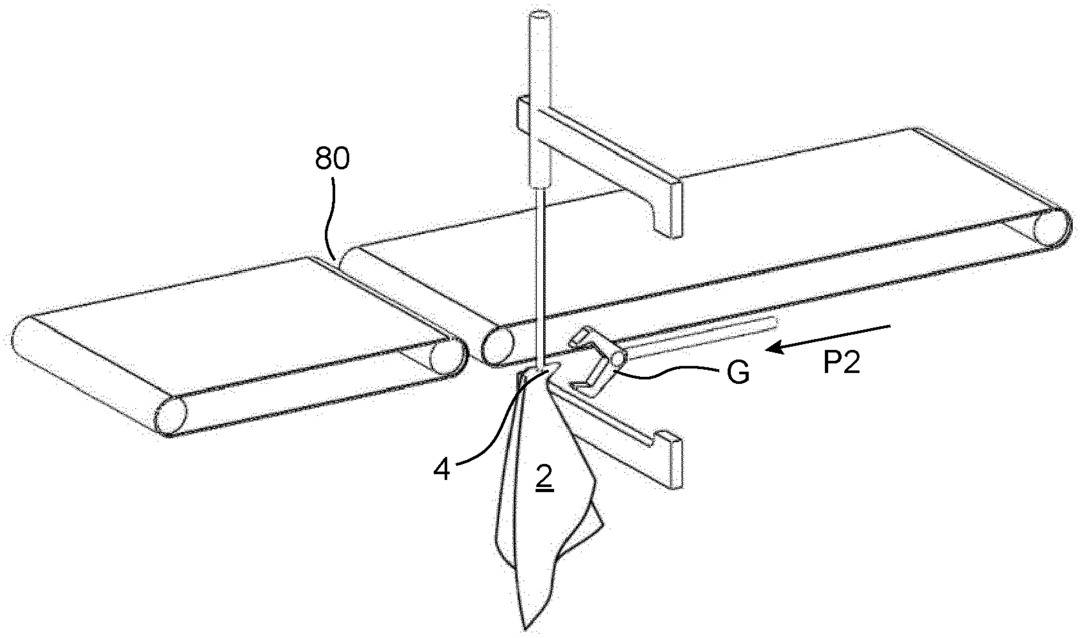

For operation of the device 1 the controller C is configured to move the gripper 100 with the captured item 2 along the transverse direction A, parallel with the gap 80 and into a release position outside the gap 80, away from the first and second conveyor belts 10, 50, as shown to the right in FIG. 2 and in FIGS. 5-6. In this process is the selected laundry item 2 pulled sideways off the second conveyor belt 50 onto which the selected laundry item 2 has been partially transferred.

In the release position, where the laundry item 2 hangs suspended from the gripper 100 as shown in FIGS. 5 and 6, the captured portion 3, 3', 3", 3", which most likely corresponds to a corner 4 of the item 2, may be transferred to a further gripper G, moving in this process the two capturing parts 110, 150 away from each other. The laundry item 2 hanging now suspended from the further gripper G at its corner 4 may then be transferred to dedicated equipment for locating and gripping the aforementioned adjacent corner of the item 2, to then transfer and present a front edge of the laundry item 2 directly to the ironing and/or folding machinery or to a conveyor advancing the laundry item 2 to such machinery.

It is noted that analysis by the controller C of a digital image of each laundry item 2 generated by the camera 300 may determine the contour and/or shape of the item 2 lying on the first conveyor belt 10, based, by way of example, on a difference in colour between the colour of the item 2 and the colour of the conveyor belt 10. This may be a simple 2D image analysis, avoiding the need for equipment performing any 3D image analysis.

As may be understood from the above, for the laundry item 2 shown in FIG. 2, which laundry item 2 partially covers the shown downstream item 2', the controller C may select, among portions 3, 3', 3" thereof having a pointed shape, a laundry item 2 trailing portion 3 having such a pointed shape as a preferred corner 4 of the item 2 to be captured. The controller C then activates the gripper 100 when the item 2—but for the selected portion 3—has moved across the gap 80 onto the second conveyor 50. Capturing the selected portion 3 as it passes across the gap 80, and then moving the gripper 100 frame F sideways along direction A, then pulls the laundry item 2 sideways fully off the second conveyor 50, thereby separating the selected item 2 from the flow of laundry items on the two conveyors 10, 50. Side rails (not shown) may be provided where necessary to prevent other laundry items entangled with the captured laundry item 2 from falling sideways off the conveyor belts 10, 50.

Pulling the captured laundry item 2 sideways off the conveyor belts 10, 50 has been found to allow for high-speed operation of the device 1, permitting a minimum of disturbance of the flow of laundry items lying on the first conveyor belt 10 and allowing an item 2 on the first conveyor belt 10 immediately following the laundry item 2 being pulled off to be also successfully processed in the manner described above, i.e. to be analysed for determination of a portion to be selected and to be pulled of sideways.

As mentioned, for the capturing the gripper 100 is moveable into correct positions along the length of the gap 80, and for this the controller C is preferably configured to determine, based on signals from an overhead position sensor 200 and on the conveyor belt speed, a) the expected arriving position along the length of the gap 80 of the selected portion 3, 3', 3" of the laundry item 2 and b) the time of arrival at the gap 80 of the selected portion 3, 3', 3", and to move the gripper 100 to the determined expected arriving position such that the selected portion 3, 3', 3" may be clamped between the upper capturing part 110 and the lower capturing part 150. The controller C is also configured to provide a release of the captured selected portion 3, 3', 3" when the gripper 100 reaches the release position next to said gap 80, for transfer of the corner 4 to the gripper G.

The downstream portion 52" of the second conveyor belt 50 defines an alternative discharge route of the laundry items 2, for returning laundry items 2' that have not been captured to the laundry receiving portion 12 of the device 1. Such non-capture may be because the image of the item 2 has not allowed for a determination of any portions 3, 3', 3" suitable for selection, such as due to the manner the item 2 was deposited onto the first conveyer 10.

Figure 7:
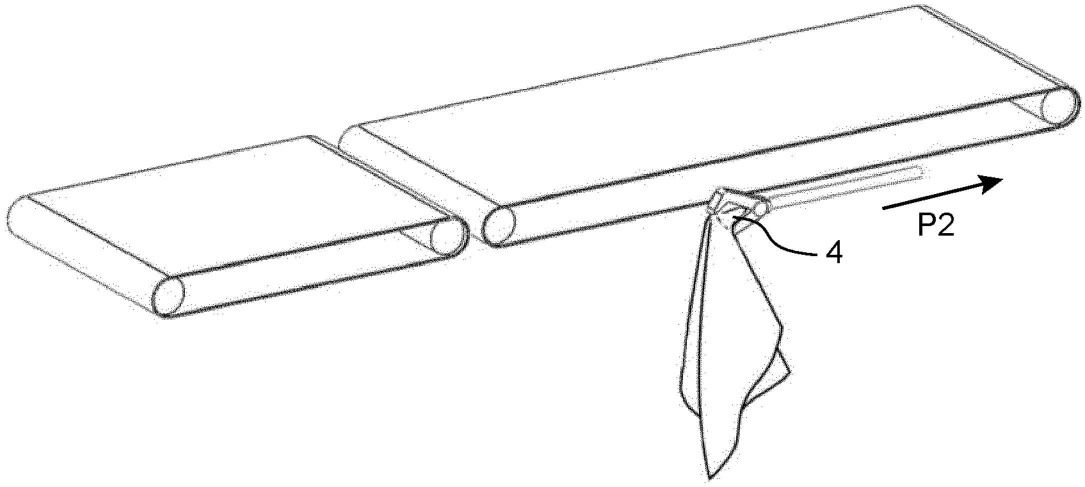

FIG. 7 shows the gripper G moving in direction P2 away from the release position, carrying the laundry item 2 suspended at the corner 4; the gripper 100 is not shown in FIG. 7 for simplicity.

Figure 8:
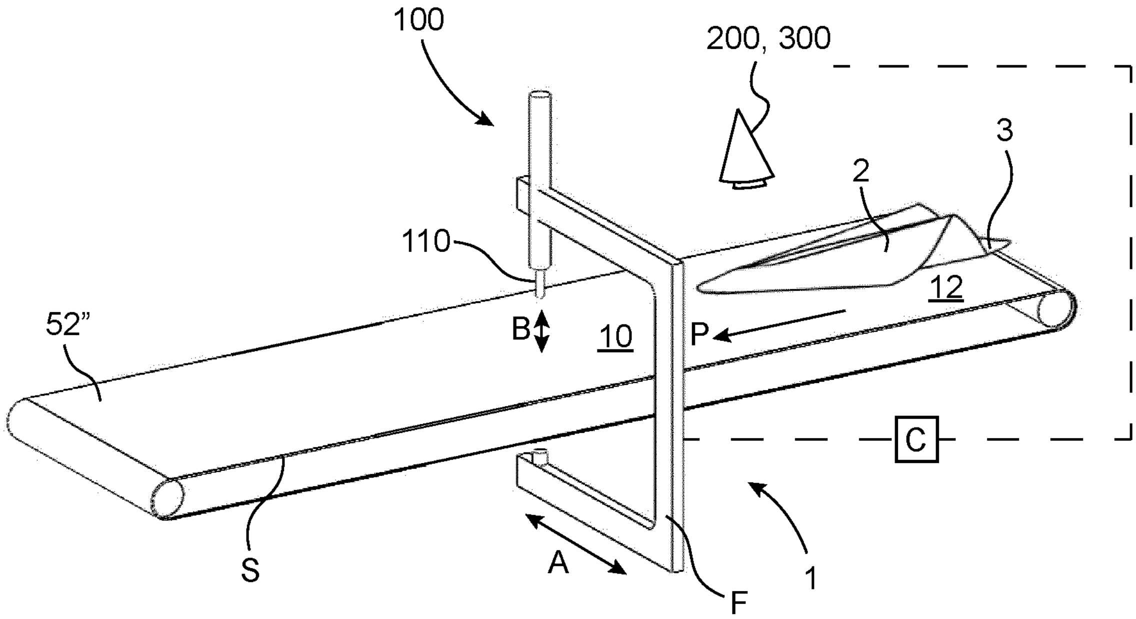
FIG. 8 is a perspective view of a second embodiment of the device of the present invention.

It is noted that in an alternative embodiment shown in FIG. 8, a single capturing part 110 of the gripper 100 may be configured to capture the selected portion 3, 3', 3" by applying suction thereto using an air pump (not shown), after the capturing part 110 having been moved downwards towards the selected portion 3 of the laundry item 2 lying on the shown conveyor belt 10, followed by the aforementioned movement in the transverse direction A to pull the selected laundry item 2 sideways off the conveyor belt 10, into a laundry item 2 release position along the side S of the conveyor belt 10; no gap 80 as discussed above needs to be provided.

While it is presently preferred that the gripper 100 shown and described above with reference to FIGS. 1-8 moves linearly only, along the shown transverse direction A, an upward movement of the gripper 100, possibly combined with the shown transverse movement A, for removing the selected laundry item 2 is also foreseen.

The invention claimed is:

1. A device for capturing a selected portion of a cloth item, the device comprising:

a first conveyor belt and a second conveyor belt, separated from each other by an elongated gap and configured to convey a cloth item across said gap in a direction;

a gripper arranged to capture a selected portion of said cloth item from above and/or below when said selected portion of said cloth item passes said gap, said gripper being movable to remove said cloth item captured by said gripper from said second conveyor belt; and a controller configured to activate said gripper to capture said selected portion of said cloth item when said selected portion of said cloth item passes said gap and for moving of said gripper to remove said cloth item captured by said gripper from said second conveyor belt, said gripper being movable along said gap into a plurality of positions along a length of said gap; and said controller being configured to determine an arriving position along said length of said gap of said selected portion of said cloth item and to move said gripper to said determined arriving position.

2. The device of claim 1, wherein said gripper moves in a second direction transverse to said direction while removing said cloth item captured by said gripper from said second conveyor belt, to a position next to said gap.

3. The device of claim 1, said gripper comprising a capturing part operating to apply a suction to said selected portion when said gripper captures said selected portion of said cloth item and when passing said gap.

4. The device of claim 1, said gripper comprising an upper capturing part and a lower capturing part arranged below said upper capturing part, at least one of said upper capturing part and said lower capturing part being movable towards the other one of said upper capturing part and said lower capturing part for capturing said selected portion of said cloth item between said upper capturing part and said lower capturing part when said selected portion of said cloth item passes said gap, said upper capturing part and said lower capturing part parts thereby providing a clamping force onto an upper face and a lower face of said selected portion of said cloth item when passing said gap.

5. The device according to claim 1, wherein said second conveyor belt defines:

a first downstream portion wherein said cloth item is removable from said second conveyor belt by said gripper moving to an outside position next to said gap; and a second downstream portion defining an alternative discharge route of said cloth item from said second conveyor, said alternative discharge route returning said cloth items to an item receiving portion of said device.

6. The device according to claim 4, said controller being configured for releasing said selected portion of said cloth item from said at least one of said upper capturing part and said lower capturing part when said cloth item has been removed from said second conveyor belt.

7. The device according to claim 1, said controller being configured to determine a time of arrival at said gap of said selected portion of said cloth item.

8. The device according to claim 5, further comprising an item identifier for identifying said cloth item conveyed from said item receiving portion, said item identifier communicating with said controller, said controller being configured to select, at least based on data from said item identifier, said cloth item to be captured by said gripper.

9. The device according to claim 1, further comprising an item contour and/or shape detector that communicates with said controller, said controller being configured to select, at least on the basis of data from said item contour and/or shape detector, said selected portion of said cloth item to be captured by said gripper.

10. The device according to claim 1, said selected portion of said cloth item being a trailing portion of said cloth item.

11. A method of capturing a selected portion of a cloth item, to then present the cloth item in a suspended form for further processing, and using a device comprising:

a first conveyor belt and a second conveyor belt, separated from each other by an elongated gap and configured to convey a cloth item across said gap in a direction;

a gripper arranged to capture a selected portion of said cloth item from above and/or below when said selected portion of said cloth item passes said gap, said gripper being movable to remove said cloth item captured by said gripper from said second conveyor belt; and a controller configured to activate said gripper to capture said selected portion of said cloth item when said selected portion of said cloth item passes said gap and for moving of said gripper to remove said cloth item captured by said gripper from said second conveyor belt;

said method comprising:

loading said cloth item onto a receiving portion of said first conveyor;

conveying said cloth item towards said gap by said first conveyor;

selecting said portion of said cloth item that is to be captured by said gripper;

determining or registering a time of arrival at said gap of said selected portion of said cloth item being conveyed towards said gap by said first conveyor;

determining or registering a position of arrival of said selected portion of said cloth item at said gap;

activating said gripper to move to said determined or registered position of arrival of said selected portion of said cloth item and to capture said selected portion of said cloth item at said determined or registered time of arrival; and moving said gripper with said captured selected portion of said cloth item to a position next to said gap, to pull said cloth item sideways off said second conveyor belt.

12. The method of claim 11, said selected portion being a portion deemed to be a corner portion of said cloth item by having a tapering geometry with a tip portion, when viewed from above said first conveyor belt.

13. The method of claim 11, further comprising transferring said selected portion of said cloth item to a further gripper, by first moving said further gripper in a direction oriented generally from a receiving portion.

14. A device for capturing a selected portion of a cloth item advanced by a conveyor belt, said device comprising:

a gripper for capturing a selected portion of a cloth item by suction, said gripper being movable from a capturing position above a conveyor belt to a position along a side of said conveyor belt to thereby remove said cloth item captured by said gripper from said conveyor belt;

a controller configured to move said gripper into said capturing position corresponding to an expected path of movement of said selected portion of said cloth item below said gripper, to activate said gripper for said capturing when said selected portion of said cloth item moved by said conveyor belt passes said capturing position, and for said moving of said gripper to said position along said side of said conveyor belt; and a device communicating with said controller, for registering an image of said item of cloth on said conveyor belt, seen from above said conveyor belt;

wherein said controller processes said image to select said selected portion of said cloth item to be captured among corresponding portions of said image showing a tapering geometry with a tip portion.

15. The device according to claim 1, said controller being configured to receive a signal indicating arrival at said gap of said selected portion of said cloth item.

16. The device according to claim 7, said controller being configured to receive a signal indicating arrival at said gap of said selected portion of said cloth item.

* * * * *